(12) United States Patent
Elliott et al.

(10) Patent No.: US 7,583,726 B2
(45) Date of Patent: Sep. 1, 2009

(54) FREQUENCY SHIFT KEYING (FSK) DATA COMMUNICATIONS USING VOICE MODEM

(75) Inventors: Jeremy Elliott, Brooklin (CA); James Long, Scarborough (CA)

(73) Assignee: Tyco Safety Products Canada Ltd., Concord, Ontario (CA)

( * ) Notice: Subject to any disclaimer, the term of this patent is extended or adjusted under 35 U.S.C. 154(b) by 660 days.

(21) Appl. No.: 11/230,840

(22) Filed: Sep. 20, 2005

(65) Prior Publication Data

US 2007/0064782 A1   Mar. 22, 2007

(51) Int. Cl.
*H04B 1/38* (2006.01)
(52) U.S. Cl. ...................................... 375/222
(58) Field of Classification Search .............. 375/222
See application file for complete search history.

(56) References Cited

U.S. PATENT DOCUMENTS

| | | | |
|---|---|---|---|
| 4,302,629 A | | 11/1981 | Foulkes et al. |
| 4,425,665 A | * | 1/1984 | Stauffer ...................... 375/223 |
| 5,726,893 A | * | 3/1998 | Schuchman et al. ....... 455/456.3 |
| 5,761,292 A | * | 6/1998 | Wagner et al. ............... 379/229 |
| 6,459,687 B1 | * | 10/2002 | Bourlas et al. ............... 370/328 |
| 7,079,628 B1 | * | 7/2006 | Burritt et al. .................. 379/52 |
| 7,286,658 B1 | * | 10/2007 | Henderson ............. 379/142.04 |
| 7,295,663 B2 | * | 11/2007 | McLaughlin et al. ... 379/212.01 |
| 2002/0172193 A1 | * | 11/2002 | Preston et al. ............... 370/352 |
| 2003/0035471 A1 | | 2/2003 | Pitsoulakis |
| 2006/0058049 A1 | * | 3/2006 | McLaughlin et al. ........ 455/466 |

OTHER PUBLICATIONS

CMX868, "CMX868 Low Power V.22 bis Modem", Consumer microcircuits Limited 2002.*
ITU, Recommendation V.23 "600/1200-baud modem standardized for use in the general switched telephone network", Nov. 1988.*
TDK, "73K324BL V.22bis/V.22/V.21/V.23 Bell 212A Single-Chip Modem w/Integrated Hybrid", Apr. 2000.*
CMX850, "CMX850 Communications Controller IC—Single-Chip Embedded 80C51 µC with Integral V.22bis Modem", Nov. 2003.*
MX604 "v.23 Compatible Modem", 1998.*
TIA/EIA-825-A (SP-3-4628-RV1) "Draft revision of TIA/EIA-825", Dec. 2002.*
Lallo, "Analysis and measurements of information transmission over an adaptive delta modulated voice channel", MILCOM 97 Proceedings, vol. 2, Nov. 2-5, 1997 pp. 1057-1061 vol. 2.*
Fujino, "An indoor bidirectional message paging system with a pocket-size terminal using a direct-conversion FSK modem", IEEE International Conference on Communications, 1989. ICC 89, BOSTONICC/89, Conference record, World Prosperity Through Communications, Jun. 11-14, 1989 pp. 1231-1235 vol. 3.*

(Continued)

*Primary Examiner*—Juan A Torres

(57) ABSTRACT

A method for transferring data over a communication link using a data rate and a voice modem not designed to provide communications at the data rate, includes generating, in a processor, a modulated Frequency Shift Keying (FSK) signal from an outgoing data stream. The voice modem, in playback mode, plays the modulated FSK signal over the communication link. The voice modem, in record mode, receives voice data from the communication link and sends the voice data to the processor, which demodulates any FSK signal that is present in the voice wave data to produce an incoming data stream.

3 Claims, 2 Drawing Sheets

OTHER PUBLICATIONS

Topic, "TP560i / TP560x 56Kbps Data/Fax/Voice Modem Chip Set User's Manual AT Command Set", Oct. 17, 2001.*

C. Chiu Chan, Philip L. Nachman, "Multimode High Performance HF Modem", Tactical Communications Conference, Apr. 1992, pp. 153-156, vol. 1, ITT Aerospace/Communications Division, Nutley, New Jersey, USA.

N. Benvenuto, "Detection of Modem Type and Bit Rate of FSK Voiceband Data Signals", IEEE International Conference on World Prosperity Through Communications, Jun. 1989, pp. 1101-1105, vol. 2, Dipartimento di Electronica, Universita di Ancona, Italy.

* cited by examiner

FREQUENCY SHIFT KEYING (FSK) DATA COMMUNICATIONS USING VOICE MODEM

BACKGROUND

It is desirable to be able to communicate with security equipment from a remote location, for example, for programming the equipment or for checking the status of the system.

Conventional modems that can be bought off the shelf today no longer support slow data rates such as 110 or 300 baud. This poses a serious problem as security equipment manufacturers can no longer provide downloading software (DLS) for use with currently available modems to remotely administer its security panels.

The original solution was to create a custom proprietary modem (MD-12) that would support 110 baud and could be used with DSC®panels. This solution was implemented and does work; however, it has its limitations. In particular, the MD-12 modem does not support the higher baud rates that would be desirable to be incorporated into new security panels. Thus, the client must purchase an MD-12 even though the client may already have a working modem.

Another problem is that the MD-12 is limited to the low standard data rate of 300 baud. Thus, if a new security product is released that supports higher baud rates, the client must purchase and use two modems in order to remotely support all types of panels.

SUMMARY OF THE INVENTION

The solution according to an embodiment of the present invention provides the client with a software package that allows any off the shelf voice modem to communicate at low (110 to 300 baud) frequency shift keyed (FSK) baud rates that they do not inherently support in data mode. This is done by using the modem's voice recording and playing capabilities. Standard current-technology voice modems can record or playback voice waveform data with sampling rates high enough to support FSK data transmission, and reception. The modem, when in record mode, sends voice wave data to the computer software, which demodulates any FSK that is present. In playback mode, on the other hand, the modem plays modulated FSK data generated by the computer software.

New "off the shelf" voice modems provide a method of getting wave data in, or out, from the host computer application, but usually do not inherently support such a low baud rate as 110 baud. The present invention provides the usage of existing internal modulation/demodulation features of a modem for higher baud rate full-duplex communications, and expands upon this into lower baud rates, using the voice mode and software.

Accordingly, a method for transferring data over a communication link using a data rate and a voice modem not designed to provide communications at the data rate, includes generating, in a processor, a modulated FSK signal from an outgoing data stream. The voice modem, in playback mode, plays the modulated FSK signal over the communication link. Further, the voice modem, in record mode, receives voice data from the communication link and sends the voice data to the processor, which demodulates any FSK signal that is present in the voice wave data to produce an incoming data stream.

When communicating with equipment capable of communicating at a second data rate, the voice modem further transfers data at the second data rate. Thus, the voice modem is made to transfer data at least two different rates, at least one of which it was not designed for.

According to another embodiment of the present invention, a security system remote access apparatus includes a processor that generates a modulated FSK signal from an outgoing data stream; and a voice modem that, in playback mode, plays the modulated FSK signal over a communication link, and in record mode, receives voice data from the communication link and sends the voice data to the processor. The processor demodulates any FSK signal that is present in the voice wave data to produce an incoming data stream.

In yet another embodiment, received and transmitted data may be transferred at two different data rates. The voice modem may not have been designed to support either data rate, or may have been designed to support one of the data rates but not the other.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

Figure 1:
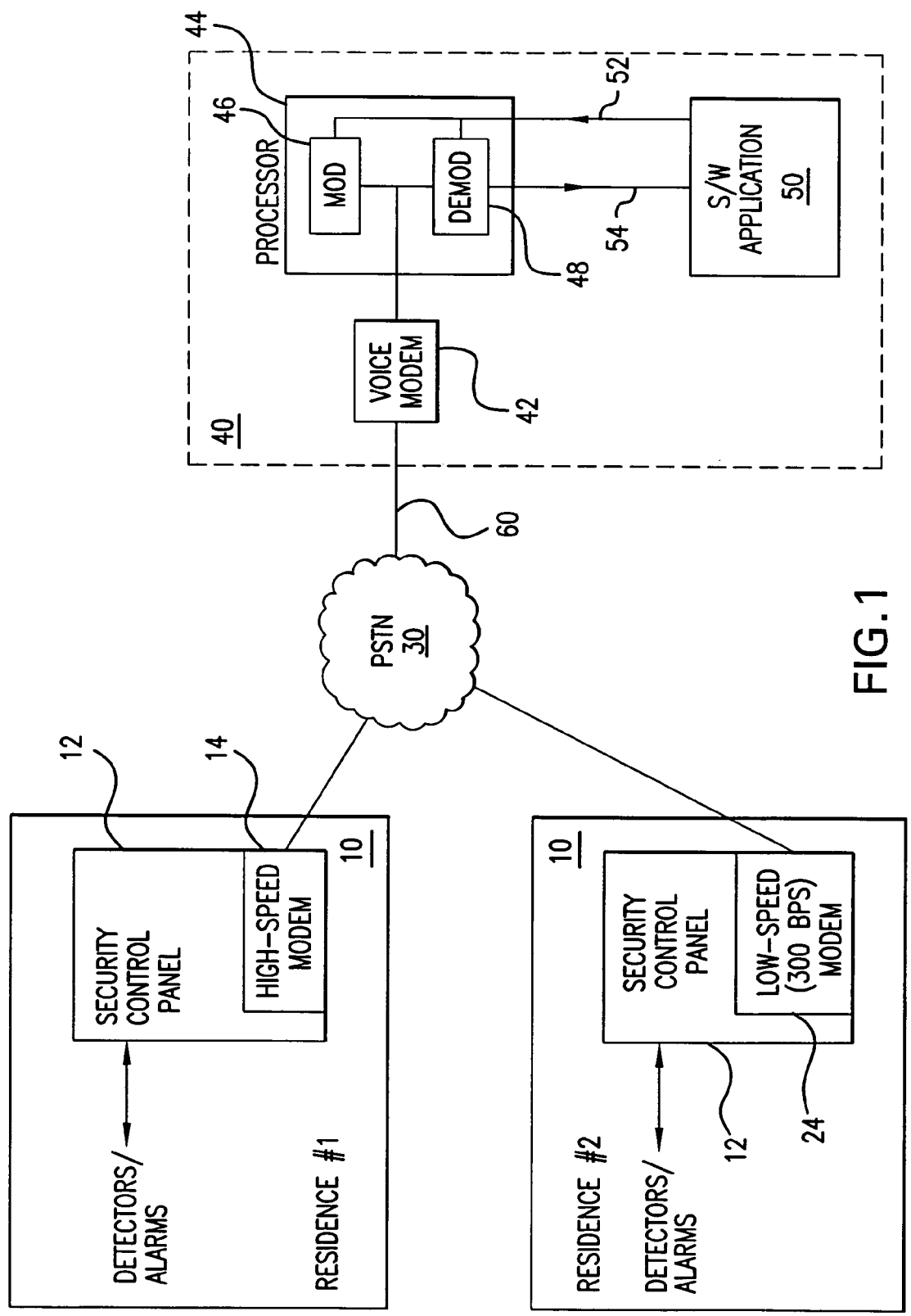
FIG. 1 is a schematic diagram of an embodiment of the present invention.

FIG. 1 is a schematic diagram of an embodiment of the present invention. For simplicity, two protected sites 10 are shown, although it would be understood by one of ordinary skill in the art that there could be many more protected sites including residences, offices, stores and other facilities.

Each protected site 10 has a security control panel 12 that receives information from various sensors or detectors such as passive infrared (PIR) sensors, motion detectors, glass breakage detectors, and the like. The security control panels also typically control one or more alarms.

In addition, each security control panel has a modem for reporting to a central monitoring station (not shown) over the public switched telephone network (PSTN) 30 when an intrusion is detected. Here, one of the protected sites 10 is shown with a relatively new high-speed modem 14. The other site 10 has an older 300 baud modem.

It is desirable that a service technician be able to access the security panels 10 remotely, for example, for programming or reprogramming the panel, or for maintenance purposes, etc. Unfortunately, modern "off the shelf" voice modems do not inherently support such low baud rates as 110 or 300 baud. Thus, the service technician is required to carry two modems: a high-speed modem for accessing and servicing sites with high-speed modems, and a separate low-speed modem for accessing and servicing sites with low-speed modems.

The present invention provides the usage of existing internal modulation/demodulation features of a voice modem for higher baud rate full-duplex communications, and expands upon this into lower baud rates, using the voice mode and software.

That is, the service technician has a system 40 that includes a voice modem 42 connected to a processor 44. The processor 44 communicates with a software application 50 such as might be utilized by the service technician to program or provide maintenance to a protected site's security control panel 10. If the protected site has a high speed modem 14, the processor 44 preferably passes data directly between the software application 50 and the voice modem 40 for communication with the protected site.

If, on the other hand, the protected site has a low-speed modem 24 with which the voice modem 42 is inherently incapable of communicating, the modulator (preferably, but not limited to, a software package) generates a modulated FSK signal from the outgoing data 52 from the software application 50. The voice modem 42, in playback mode, plays the modulated FSK signal over the communication link 60 and the slow modem 24 at the protected site is able to receive and convert the signal back to a digital stream.

Conversely, data transmitted by the slow modem 24 at the protected site is received over the communication link 60 by the voice modem 42. The modem, in record mode, receives the signal as voice data and sends the voice data to the processor 44. The demodulator (preferably, but not limited to, a software package) demodulates any FSK signal that is present in the voice wave data to produce an incoming data stream 54 that it passes on to the software application 50.

Note that while for illustrative purposes two separate paths 52, 54 are shown for the incoming 54 and outgoing 52 data streams, a single bi-directional data bus or other interface could be utiltized.

Figure 2:
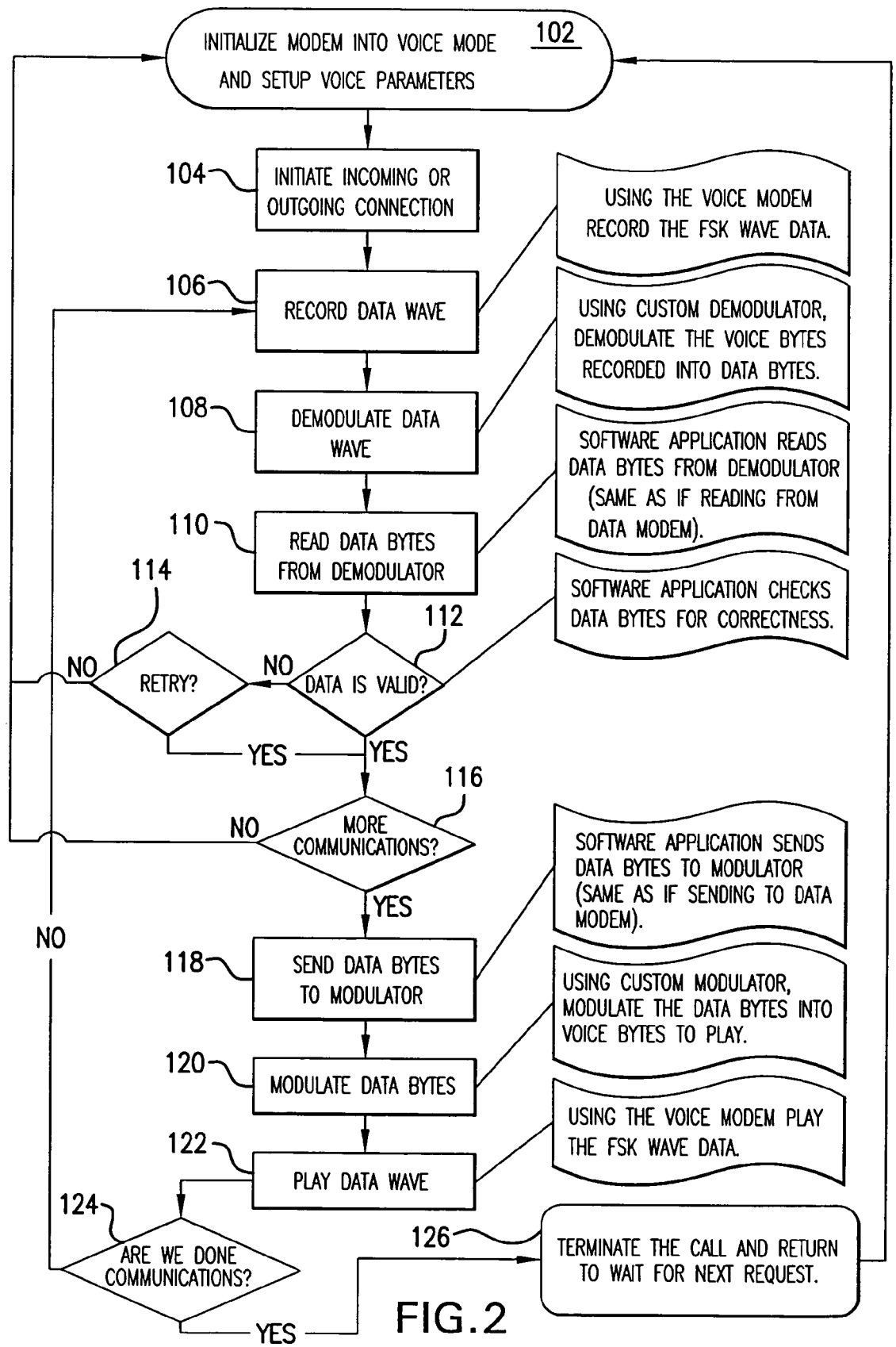
FIG. 2 is a flowchart illustrating the operation of the embodiment of FIG. 1.

FIG. 2 is a flowchart illustrating the operation of the embodiment of FIG. 1.

At step 102, the voice modem 42 is initialized into voice mode and voice parameters are set up. Then, an incoming or outgoing connection is initiated (step 104). In the case of incoming data from a low-speed modem 24, the voice modem 42 records the voice wave data (step 106). The demodulator 48 demodulates the recorded voice bytes into data bytes (step 108). At step 110, the software application 50 reads the data bytes from the demodulator 48. The software application typically checks whether the data is valid (step 112). If the data is not valid, a decision may be made (step 114) whether to retry.

Step 116 determines whether additional communications are required. If so, the system prepares to send data.

In the case of outgoing data to the low-speed modem 24, the software application 50 sends data bytes (the outgoing data stream 52) to the modulator 46 (step 118). The modulator 46 then modulates the data into voice bytes (an FSK signal) at step 120. At step 122, the voice modem 42 plays the FSK signal.

Step 124 determines whether communications are complete. If so, the call is terminated at step 126. Otherwise, the system is ready to receive more data.

While this invention has been particularly shown and described with references to preferred embodiments thereof, it will be understood by those skilled in the art that various changes in form and details may be made therein without departing from the scope of the invention encompassed by the appended claims.

What is claimed is:

1. A security system remote access apparatus, comprising:
   modulation means for generating a modulated FSK signal at a desired data rate from an outgoing data stream;
   demodulation means for demodulating any FSK signal at the desired data rate that is present in a received voice wave data to produce an incoming data stream; and
   modem means having a playback mode in which the modulated FSK signal is transmitted over a communication link, and having a record mode in which voice data received from the communication link is recorded and sent to said demodulation means,
   said modulation means and said demodulation means being external to said modem means, said modem means not designed to provide communications at the desired data rate.

2. The apparatus of claim 1, wherein the modem means comprises a voice modem.

3. A method for transferring data over a communication link using a first data rate and a voice modem not designed to provide communications at the first data rate, the method comprising:
   in a processor, generating a modulated FSK signal at the first data rate from an outgoing data stream;
   at the voice modem, in playback mode, playing the modulated FSK signal over the communication link, and in record mode, receiving voice data from the communication link at a second data rate and sending the voice data to the processor; and
   at the processor, demodulating any FSK signal that is present in the voice wave data to produce an incoming data stream;
   wherein the first data rate is different from the second data rate and the voice modem is not designed to provide communications at the second data rate.

* * * * *

UNITED STATES PATENT AND TRADEMARK OFFICE
CERTIFICATE OF CORRECTION

PATENT NO. : 7,583,726 B2
APPLICATION NO. : 11/230840
DATED : September 1, 2009
INVENTOR(S) : Elliott et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1006 days.

Signed and Sealed this

Fourteenth Day of September, 2010

David J. Kappos
*Director of the United States Patent and Trademark Office*